(12) United States Patent
Kobayashi et al.

(10) Patent No.: US 8,786,565 B2
(45) Date of Patent: Jul. 22, 2014

(54) MOBILE TERMINAL DEVICE, STORAGE MEDIUM AND NOTIFICATION CONTROL METHOD

(75) Inventors: Hiroki Kobayashi, Daito (JP); Hiroshi Tamura, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/695,415

(22) PCT Filed: Mar. 5, 2012

(86) PCT No.: PCT/JP2012/055510
§ 371 (c)(1), (2), (4) Date: Oct. 30, 2012

(87) PCT Pub. No.: WO2012/121187
PCT Pub. Date: Sep. 13, 2012

(65) Prior Publication Data
US 2013/0044072 A1     Feb. 21, 2013

(30) Foreign Application Priority Data
Mar. 7, 2011   (JP) .................................. 2011-049644

(51) Int. Cl.
*G06F 3/041*     (2006.01)

(52) U.S. Cl.
USPC ........ 345/173; 178/18.06; 715/833; 715/844; 715/863; 345/172

(58) Field of Classification Search
USPC ................... 345/172, 173; 178/18.06, 18.03; 715/808, 833, 863, 844
See application file for complete search history.

(56) References Cited

U.S. PATENT DOCUMENTS

| 8,228,300 B2* | 7/2012 | Lundy et al. .................. 345/173 |
| 2007/0150842 A1* | 6/2007 | Chaudhri et al. ............. 715/863 |
| 2008/0215980 A1* | 9/2008 | Lee et al. ...................... 715/716 |

(Continued)

FOREIGN PATENT DOCUMENTS

| JP | H02-030095 A | 1/1990 |
| JP | H04-085668 A | 3/1992 |

OTHER PUBLICATIONS

International Search Report and Written Opinion of the International Searching Authority issued by Japan Patent Office for International Application No. PCT/JP2012/055510, Dated May 1, 2012.

*Primary Examiner* — Lun-Yi Lao
*Assistant Examiner* — Priyank Shah
(74) *Attorney, Agent, or Firm* — Procopio, Cory, Hargreaves & Savitch LLP

(57) ABSTRACT

A cellular phone 1 includes displays 11 and 12, touch sensors 12 and 22 which receives an operation on the displays 11 and 12, an external speaker 308 which performs a notification action, and a CPU 100 which controls the displays 11, 12 and the external speaker 308. Here, the CPU 100 displays a snooze button B6 and a dismiss button B7, which are a target of the operation, on the display 11 or 21 during the notification action. If an operation on the snooze button B6 is a confirmation flick, the CPU 100 stops the notification action and furthermore resumes the notification action if standby time elapses after the notification action stops. In contrast, if an operation on the dismiss button B7 is a confirmation flick, the CPU 100 stops the notification action and furthermore cancels a setting of the notification action.

18 Claims, 16 Drawing Sheets

(56) References Cited

U.S. PATENT DOCUMENTS

| | | | |
|---|---|---|---|
| 2009/0247112 A1* | 10/2009 | Lundy et al. | 455/404.1 |
| 2009/0249252 A1* | 10/2009 | Lundy et al. | 715/817 |
| 2010/0146384 A1* | 6/2010 | Peev et al. | 715/255 |
| 2010/0184484 A1* | 7/2010 | Lindberg et al. | 455/566 |
| 2010/0192105 A1* | 7/2010 | Kim et al. | 715/834 |
| 2011/0087981 A1* | 4/2011 | Jeong et al. | 715/765 |
| 2011/0111735 A1* | 5/2011 | Pietrow | 455/414.1 |
| 2011/0209099 A1* | 8/2011 | Hinckley et al. | 715/863 |
| 2011/0219334 A1* | 9/2011 | Park | 715/808 |
| 2011/0239144 A1* | 9/2011 | Rapp et al. | 715/765 |
| 2012/0054683 A1* | 3/2012 | Sands et al. | 715/825 |
| 2012/0102400 A1* | 4/2012 | Worley et al. | 715/702 |
| 2012/0102437 A1* | 4/2012 | Worley et al. | 715/863 |
| 2012/0216140 A1* | 8/2012 | Smith | 715/780 |

\* cited by examiner

MOBILE TERMINAL DEVICE, STORAGE MEDIUM AND NOTIFICATION CONTROL METHOD

TECHNICAL FIELD

The present invention relates to a mobile terminal device such as a cellular phone or PDA (Personal Digital Assistant), tablet PC (Tablet PC), and a preferred storage medium and a notification control method to be used in a mobile terminal device.

BACKGROUND ART

A mobile terminal device such as a cellular phone typically has an alarm function. In such a mobile terminal device, an alarm sound is produced at time preset by a user. The user can stop the alarm sound by performing a predetermined stop operation.

Some of such mobile terminal devices have a touch panel. A touch panel is composed of a display and a touch sensor arranged on a display surface of the display, and any input to the display surface is detected by the touch sensor.

Thus, if a mobile terminal device includes a touch panel, such a configuration may be adopted that an alarm sound stops when the touch panel is touched while the alarm sound is produced.

SUMMARY OF INVENTION

Technical Problem

However, when it is not used, a mobile terminal device is often placed in a bag or pocket and carried. Thus, if a mobile terminal device includes a touch panel, any object in the bag or pocket easily contacts the touch panel while the device is carried.

As described above, if the configuration that a contact with the touch panel stops the alarm sound is adopted, the alarm sound also stops in the event of any contact with the touch panel which is not intended by the user. Thus, a trouble that the user does not notice any alarm sound tends to occur.

The present invention has been made in light of such a problem, and an object of the present invention is to provide a mobile terminal device which can prevent a notification action from being inadvertently stopped, a storage medium, and a notification control method.

Solution to Problem

A mobile terminal device according to a first embodiment of the present invention includes a display section, a display control section which controls the display section, a receiving section which receives an operation on the display section, a notifying section which performs a notification action, and a notification control section which controls the notification section. Here, the display control section displays on the display section a first object image and a second object image, which are a target of the operation, during the notification action. Then, when the receiving section receives a movement operation to move either of the first object image or the second object image, the notification control section performs a process to stop the notification action or to perform a predetermined action as well as to stop the notification action, depending on the moved object image.

A second embodiment of the present invention relates to a storage medium which holds a computer program applied to a mobile terminal device. The mobile terminal device including a display section, a receiving section which receives an operation on the display section, and a notifying section which performs a notification action. The computer program provides a computer of the mobile terminal device with capabilities of displaying on the display section a first object image and a second object image, which are a target of the operation, during the notification action, and when the receiving section receives a movement operation to move either of the first object image or the second object image, performing a process to stop the notification action or to perform a predetermined action as well as to stop the notification action, depending on the moved object image.

A third embodiment of the present invention relates to a notification control method of a mobile terminal device including a display section, a receiving section which receives an operation on the display section, and a notifying section which performs a notification action. The notification control section according to the embodiment includes steps of: displaying on the display section a first object image and a second object image, which are a target of the operation, during the notification action; and when the receiving section receives a movement operation to move either of the first object image or the second object image, stopping the notification action or performing a predetermined action as well as stopping the notification action, depending on the moved object image.

Advantageous Effects of Invention

The present invention can prevent a notification action of a mobile terminal device from being inadvertently stopped.

An advantage or significance of the present invention will become clearer from the description of embodiment, as shown below. However, the following description of embodiment is simply one illustration in embodying the present invention, and the present invention is not limited by what is described in the following description of embodiment.

Figure 1:
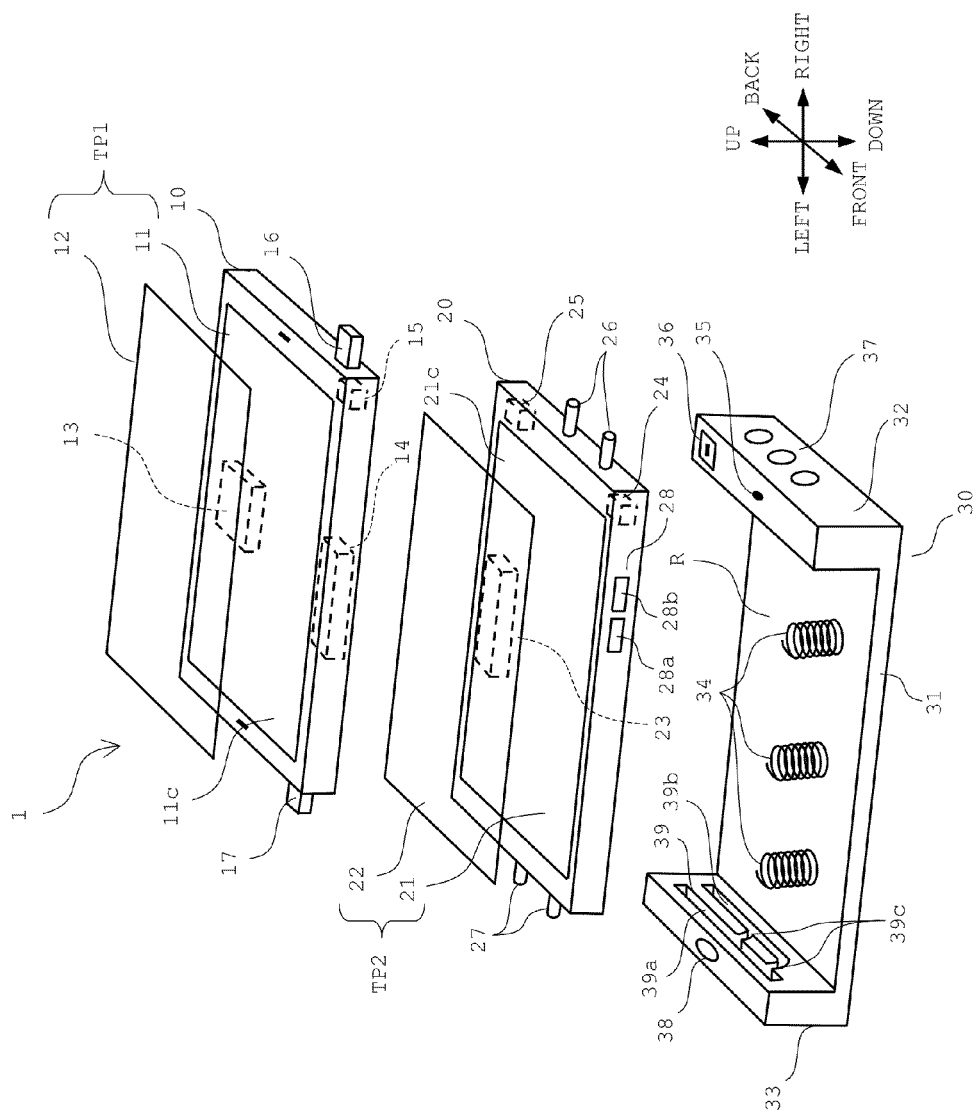
FIG. 1 is a diagram showing a configuration of a cellular phone according to an embodiment.

The drawings are mainly used for a description of one example of the embodiment, and not intended to limit a scope of the present invention.

DESCRIPTION OF EMBODIMENTS

In the following, embodiments of the present invention will be described with reference to the drawings.

In the embodiments, a first display 11 corresponds to a "display section" and a "first display section" described in the claims. A second display 21 corresponds to the "display section" and a "second display section" described in the claims. A first touch sensor 12 and a second touch sensor 22 correspond to a "receiving section" described in the claims. A CPU 100 corresponds to a "display control section" and a "notification control section" described in the claims. A memory 200 corresponds to a "storage section" described in the claims. An external speaker 308 corresponds to a "notifying section" described in the claims. An Up key 28a corresponds to an "operation section" described in the claims. A dismiss button B7 corresponds to a "first object image" described in the claims. A snooze button B6 corresponds to a "second object image" described in the claims. A message window W1 corresponds to a "screen prompting a movement operation" described in the claims. A "mechanism section" described in the claims is composed of magnets 14, 23, protruding portions 16, 17, shaft portions 26, 27, coil springs 34 and guiding grooves 39. A description of correspondence between the above-mentioned claims and the embodiments is simply one example and not intended to limit the claims of the present invention to the embodiments.

<Configuration of Cellular Phone>

FIG. 1 is an exploded perspective view showing a configuration of a cellular phone 1. The cellular phone 1 is composed of a first cabinet 10, a second cabinet 20, and a holder 30 which holds the first cabinet 10 and a second cabinet 20.

The first cabinet 10 has a horizontally long rectangular solid shape. A first touch panel TP1 is arranged on the first cabinet 10. The first touch panel TP1 includes a first display 11 and a first touch sensor 12. A surface of the first touch panel TP1 is covered by a protective cover.

Figure 3:
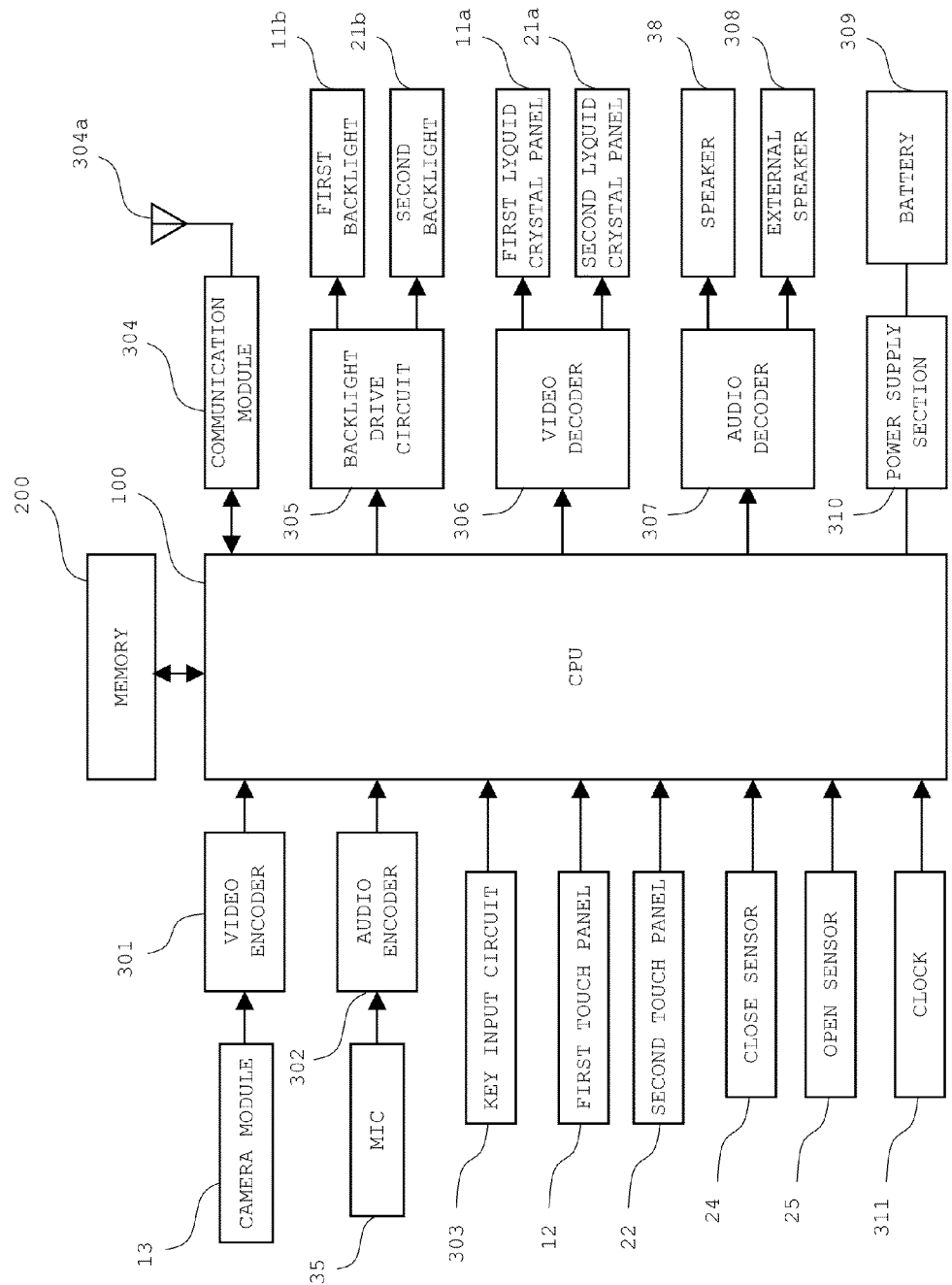
FIG. 3 is a block diagram showing an overall configuration of the cellular phone according to the embodiment.

The first display 11 is composed of a first liquid crystal panel 11a and a first backlight 11b for illuminating the first liquid crystal panel 11a (See FIG. 3). A first display surface 11c is provided on a front face of the first liquid crystal panel 11a and images (screens) are displayed on the first display surface 11c. The first backlight 11b includes one or more light sources. The first touch sensor 12 is arranged on the first display 11 in an overlapped state.

The first touch sensor 12 detects input to the first display 11. The first touch sensor 12 is a transparent rectangle shaped sheet and covers the first display surface 11c of the first display 11. The first touch sensor 12 includes a matrix-like arranged first transparent electrode and a second transparent electrode. By detecting a change in capacitance between the transparent electrodes, the first touch sensor 12 detects a position on the first display surface 11c touched by a user and outputs a position signal corresponding to that position. In the embodiment, the user touching on the first display surface 11c includes not only the user completely touching the first display surface 11c with a contact member such as a pen or a finger, for example, but also placing the contact member or the finger in proximity to the first display surface 11c.

The user can perform various operations such as "tapping", "sliding", "flicking", and "long tapping" on the first display surface 11c by touching the first display surface 11c with his/her finger and the like.

"Tapping" used herein is an operation of the user tapping the display surface with a contact member or a finger. Specifically, it refers to an operation of the user bringing the contact member or the finger into contact with the display surface and then releasing the contact member or the finger from the display surface in a short time. "Sliding" is an operation of the user moving the contact member or the finger with the contact member or the finger in contact with the display surface. "Flicking" is an operation of the user quickly flicking the contact member of the finger at the display surface. Specifically, it refers to an operation of the user moving the contact member or the finger for more than a specified distance in a short time with the contact member or the finger in contact with the display surface. "Long tapping" refers to an operation of the user continuously keeping the contact member or the finger in contact with a same position on the display surface for a longer time (than the time of tapping). Operations of the user touching the display surface, including such operations as "tapping", "sliding", "flicking", "long tapping" are collectively referred to as "touching". In addition, an operation of touching an object image which is displayed on the display surface and a target of the operation, such as an icon, a snooze button and a dismiss button to be discussed later, by a finger and the like and then moving the touched object image by sliding the finger and the like is referred to as "dragging".

In the first cabinet 10, a camera module 13 is arranged at a position slightly back of a center. A lens window for capturing a subject image in the camera module 13 is provided on an underside of the first cabinet 10.

In the first cabinet 10, a magnet 14 is arranged at a center position in the vicinity of the front face and a magnet 15 is arranged at the right front corner.

In addition, the protruding portions 16, 17 are provided on the right and left sides of the first cabinet 10.

The second cabinet 20 has a horizontally long rectangular solid shape and has almost the same shape and size as the first cabinet 10. A second touch panel TP2 is arranged on the second cabinet 20. The second touch panel TP2 includes a second display 21 and a second touch sensor 22. A surface of the second touch panel TP2 is covered by a protective cover.

The second display 21 is composed of a second liquid crystal panel 21a and a second backlight 21b which illuminates the second liquid crystal panel 21a (See FIG. 3). A second display surface 21c is provided on a front face of the second liquid crystal panel 21a and images (screens) are displayed on the second display surface 21c. The second backlight 21b includes one or more light sources. The second touch sensor 22 is arranged on the second display 21 in a overlapped state.

The first display 11 and the second display 21 may be composed of other display elements such as an organic electroluminescence (EL).

The second touch sensor 22 detects input to the second display 21. A configuration of the second touch sensor 22 is similar to that of the first touch sensor 12. The user can perform various operations such as "tapping", "sliding", "flicking", and "long tapping" on the second display surface 21c by touching the second display surface 21c with his/her finger and the like.

In the second cabinet 20, a magnet 23 is arranged at a center position in the vicinity of a rear face. The magnet 23 and the magnet 14 of the first cabinet 10 attract each other in an open state to be discussed later.

In the second cabinet 20, a close sensor 24 is arranged at the right front corner and an open sensor 25 is arranged on the right back corner. The close sensor 24 and the open sensor 25 are composed of a hall IC and the like, for example, and output a detection signal in response to magnetic force of the magnet 15. In a closed state to be described later, since the magnet 15 of the first cabinet 10 is in proximity to the close sensor 24, an ON signal is output from the close sensor 24. In contrast, when the state changes from closed to open, the magnet 15 of the first cabinet 10 is in proximity to the open sensor 25. Thus, an ON signal is output from the open sensor 25.

Two respective shaft portions 26 and 27 are provided on both sides of the second cabinet 20. In addition, a volume key 28 to be operated mainly to adjust volume of a speaker and an external speaker, to be described later, is provided on the front face of the second cabinet 20. The volume key 28 includes an up key 28a for turning up the volume and a down key 28b for turning down the volume.

The holder 30 is composed of a bottom plate portion 31, a right holding portion 32 formed on a right edge part of the bottom plate portion 31, and a left holding portion 33 formed on a left edge part of the bottom plate portion 31.

Three coil springs 34 are arranged on the bottom plate portion 31 so that the coil springs 34 line in a horizontal direction. With the second cabinet 20 attached to the holder 30, the coil springs 34 abut an underside of the second cabinet 20 and exhibit force pushes up the second cabinet 20.

On an upper surface of the right holding portion 32, a microphone 35 (hereinafter referred to as a "mic") and a power supply key 36 are arranged. A speaker 38 is arranged on an upper surface of the left holding portion 33. A plurality of operation keys 37, which are hard keys, are arranged on an outer surface of the right holding portion 32.

On inner sides of the right holding portion 32 and the left holding portion 33, guiding grooves 39 (only that on the left holding portion 33 is shown) are formed. The guiding grooves 39 are composed of an upper groove 39a, a lower groove 39b, and two vertical grooves 39c. The upper groove 39a and the lower groove 39b extend in a forward-backward direction, and the vertical grooves 39c extend upward and downward so as to connect the upper groove 39a and the lower groove 39b.

When the cellular phone 1 is assembled, the shaft portions 26 and 27 are inserted into the lower groove 39b of the guiding grooves 39, and the second cabinet 20 is arranged in a containing region R of the holder 30. The protruding portions 16 and 17 are inserted into the upper groove 39a of the guiding grooves 39, and the first cabinet 10 is fitted in the containing region R of the holder 30. The first cabinet 10 is arranged on the second cabinet 20.

In this manner, the first cabinet 10 and the second cabinet 20 are contained in a vertically overlapped state into the containing region R surrounded by the bottom plate portion 31, the right holding portion 32, and the left holding portion 33. In this state, the first cabinet 10 can be slid forward and backward along the upper groove 39a. The second cabinet 20 can be slid forward and backward along the lower groove 39b. When the second cabinet 20 moves forward and the shaft portions 26 and 27 reach the position of the vertical groove 39c, the second cabinet 20 is guided by the vertical groove 39c and becomes vertically slidable.

FIGS. 2(a) to 2(d) are diagrams for illustrating how the cellular phone 1 is switched from a closed state to an open state. The closed state corresponds to a first form of the present invention, and the open state corresponds to a second form of the present invention.

Figure 2:
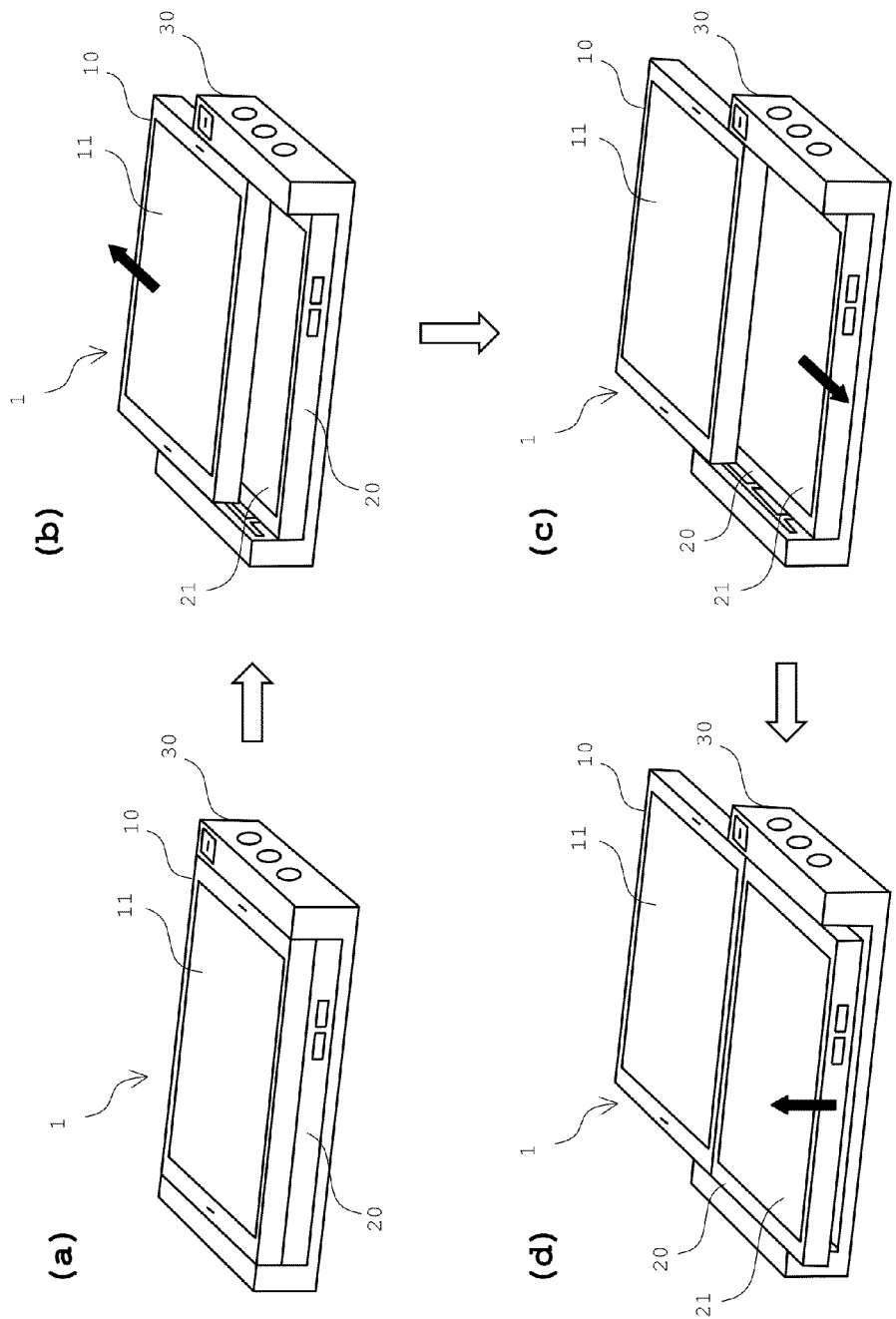
FIGS. 2(a) to 2(d) are diagrams for describing an operation to switch the cellular phone from a closed state to an open state according to the embodiment.

The closed state shown in FIG. 2(a) is a state in which the cellular phone 1 is folded. The first cabinet 10 is overlapped on the second cabinet 20 in the closed state. The second display surface 21c is masked by the first cabinet 10, and only the first display surface 11c is exposed to the external.

As shown in FIG. 2(b), the first cabinet 10 is moved backward, and as shown in FIG. 2(c), the second cabinet 20 is moved forward. When the second cabinet 20 dose not overlap the first cabinet 10 at all, the shaft portions 26 and 27 as shown in FIG. 1 reach the position of the vertical groove 39c. Since the shaft portions 26 and 27 become movable along the vertical groove 39c, the second cabinet 20 can move up and down. The second cabinet 20 rises due to elastic force of the coil springs 34 and attraction between the magnet 14 and the magnet 23.

As shown in FIG. 2(d), the second cabinet 20 is closely juxtaposed to the first cabinet 10, and the second display surface 21c of the second cabinet 20 becomes flush with the first display surface 11c. Thus, the cellular phone 1 is switched to the open state. In the open state, the first cabinet 10 and the second cabinet 20 are positioned back and forth, and both the first display surface 11c and the second display surface 21c are exposed to the external.

FIG. 3 is a block diagram showing an overall configuration of the cellular phone 1. In addition to the components described above, the cellular phone 1 of the embodiment includes a CPU 100, a memory 200, a video encoder 301, an audio encoder 302, a key input circuit 303, a communication module 304, a backlight drive circuit 305, a video decoder 306, an audio decoder 307, an external speaker 308, a battery 309, a power supply section 310, and a clock 311.

The camera module 13 has an image pickup device such as CCD. The camera module 13 digitalizes an imaging signal output from the image pickup device, subjects the imaging signal to various corrections such as gamma correction, and outputs the imaging signal to the video encoder 301. The video encoder 301 encodes the imaging signal from the camera module 13 and outputs the imaging signal to the CPU 100.

The mic 35 converts collected sound into an audio signal and outputs the audio signal to the audio encoder 302. The audio encoder 302 not only converts the analog audio signal from the mic 35 into a digital audio signal, but also encodes and outputs the audio signal to the CPU 100.

When the power supply key 36, the operation key 37 or the volume key 28 is pressed, the key input circuit 303 outputs an input signal corresponding to the key to the CPU 100.

The communication module 304 converts various data (sound data, image data and the like) from the CPU 100 into a radio signal and transmits the radio signal to a base station via an antenna 304a. In addition, the communication module 304 converts a radio signal received via the antenna 304a into various data and outputs the data to the CPU 100.

The backlight drive circuit 305 supplies to the first backlight 11b and the second backlight 21b a drive signal based on a control signal from the CPU 100. The first backlight 11b turns on by a drive signal from the backlight drive circuit 305 and illuminates the first liquid crystal panel 11a. The second backlight 21b turns on by a drive signal from the backlight drive circuit 305, and illuminates the second liquid crystal panel 21a.

The video decoder 306 converts image data from the CPU 100 into image signals which can be displayed on the first liquid crystal panel 11a and the second liquid crystal panel 21a, and outputs the image signals to the liquid crystal panels 11a and 21a. The first liquid crystal panel 11a displays an image corresponding to the image signal on the first display surface 11c. The second liquid crystal panel 21a displays an image corresponding to the image signal on the second display surface 21c.

The audio decoder 307 decodes an audio signal and a tone signal of various notifying sounds such as a ring tone or alarm sound from the CPU 100, and further converts the audio signal and the tone signal into an analog audio signal and an analog tone signal. The speaker 38 reproduces the audio signal from the audio decoder 307 as sound. The external speaker 308 reproduces the tone signal from the audio decoder 307 as notifying sound.

The battery 309 supplies electric power to the CPU 100 and each section other than the CPU 100. The battery 309 is connected to the power supply section 310.

The power supply section 310 converts voltage of the battery 309 to the amount of voltage necessary for each section and supplies the voltage to each section. In addition, the power supply section 310 supplies electric power fed via an external power supply (not shown) to the battery 309 to charge the battery 309.

The clock 311 measures a length of time and outputs to the CPU 100 a signal corresponding to the measured length of time.

The memory 200 includes ROM and RAM. A control program for providing the CPU 100 with a control function is stored in the memory 200. The control program includes an application program (hereinafter simply referred to as an "application") for notifying an alarm at alarm time to be described later. The control program includes various other applications such as a telephone call application, an e-mail application, a web browser, and so on.

In addition, data of images taken with the camera module or various data captured from the external via the communication module 304 is saved in a predetermined file format in the memory 200.

Based on an operation input signal of the key input circuit 303 and the touch sensors 12 and 22, the CPU 100 operates the camera module 13, the mic 35, the communication module 304, the liquid crystal panels 11a, 21a, the telephone speaker 38, the external speaker 308 and the like in accordance with the control program. Thus, various applications are executed.

The CPU 100 generates the launcher screen and execution screens for various applications in a work area prepared in the memory 200 and outputs a video signal for displaying the screens to each of the displays 11 and 21.

In addition, the CPU 100 determines what is an operation on the display surfaces 11c and 21c, based on detection results of the touch sensors 12 and 22. For example, when time for input to the display surfaces 11c and 21c was detected is shorter than a specified length of time and there is no movement of an input position, the CPU 100 determines that a tapping operation was performed on the display surfaces 11c and 21c. When the input position was moved, the CPU 100 determines that a sliding operation was performed on the display surfaces 11c and 21c. When a first input position was a display position of the snooze button B6 and the dismiss button B7, to be described later, and there was movement of the input position which was determined as a sliding operation from that position, the CPU 100 determines that a dragging operation was performed on the buttons B6 and B7. When a finger and the like was released from the display surfaces 11c and 21c at such speed that the snooze button B6 and the dismiss button B7 were moved more than a first specified distance (320 pixels, for example) within unit time (0.2 s, for example) after the release, the CPU 100 determines that a flicking operation to confirm an operation on the button B6 and B7 (hereinafter referred to as a "confirmation flick") was performed.

<Function of Cellular Phone>

Figure 4:
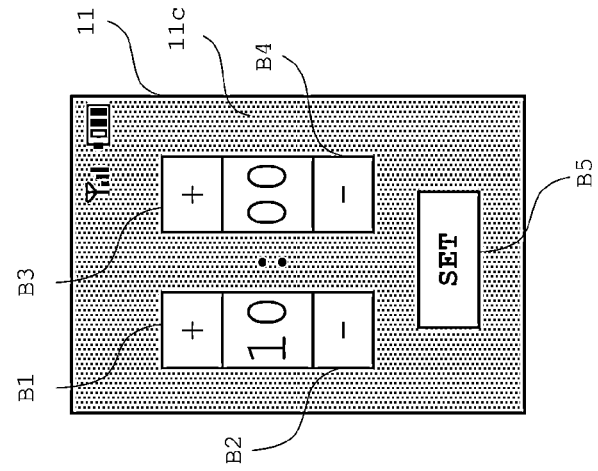
FIG. 4(a) is a diagram showing a state in which a launcher screen displayed on a first display surface.
FIG. 4(b) is a diagram showing a state in which a screen for setting alarm time is displayed on the first display surface according to the embodiment.
Figure 4:
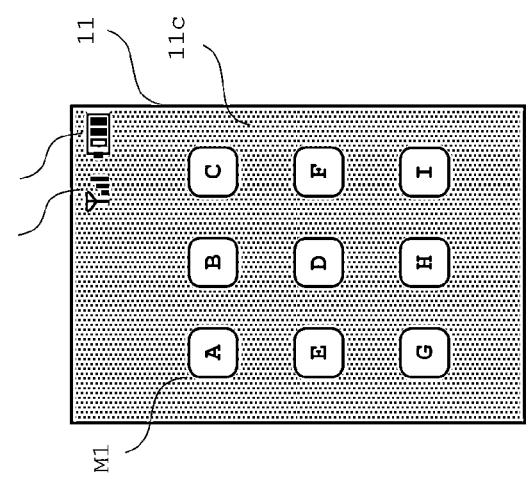

FIG. 4(a) is a diagram showing a state in which the launcher screen is displayed on the first display surface 11c with the cellular phone 1 closed. FIG. 4(b) is a diagram showing a state in which a screen for setting alarm time is displayed on the first display surface 11c with the cellular phone 1 closed.

When the cellular phone 1 is closed, a screen is displayed on the first display surface 11c so that a horizontal direction of the cellular phone 1 (see FIG. 1) is a vertical direction of the screen.

As shown in FIG. 4(a), icons M1, each corresponding to various types of applications, are displayed on the launcher screen. In addition to the applications with which the cellular phone 1 has been equipped in advance, an application can be obtained by downloading through Internet, for example, and the obtained application is installed, thereby being added to the cellular phone 1.

On the launcher screen, an antenna mark M2 showing reception condition and a remaining power mark M3 showing remaining battery charge of the battery 309 are displayed. The user can confirm the reception condition with the antenna mark M2 and the remaining battery charge of the battery 309 with the remaining power mark M3.

The user can activate a desired application by tapping a desired icon M1 of a plurality of icons M1 with a finger and the like.

The memory 200 stores an icon correspondence table which associates each icon M1 with a position of the icon M1 on the display surface 11c or 21c, and an application correspondence table which associates each icon M1 with a corresponding application. When the icon M1 is tapped, the CPU 100 identifies the tapped icon M1 based on the tapped position, using the icon correspondence table. Then, using the application correspondence table, the CPU 100 identifies an application corresponding to the tapped icon M1 and activates the application. When the application is initiated, an execution screen related to the application appears on the first display surface 11c. For example, when the web browser is activated, a web page based on a URL appears on the first display surface 11c.

When the user taps the icon M1 corresponding to the alarm application among the icons M1 displayed on the launcher screen, the CPU 100 activates the alarm application.

On a setting screen shown in FIG. 4(b), the user sets time to perform alarm notification (hereinafter referred to as "alarm time"). On the setting screen, a plus button B1 and a minus button B2 for increasing or decreasing "hours", a plus button B3 and a minus button B4 for increasing or decreasing "minutes", and a set button B5 for determining time are displayed. When the user sets time and presses the set button B5, the CPU 100 stores the set time in the memory 200.

When the alarm time is thus set, processing of alarm notification control to be described later will start.

Figure 5:
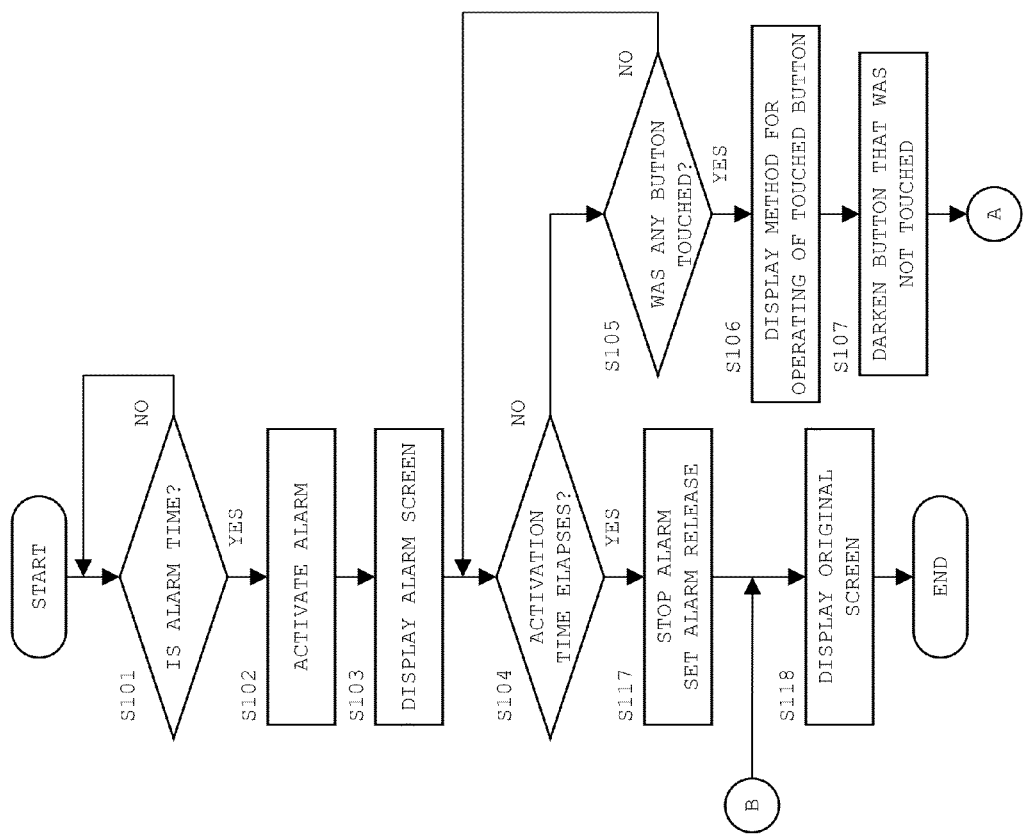
FIG. 5 is a flow chart showing a procedure for processing alarm notification control according to the embodiment.
Figure 6:
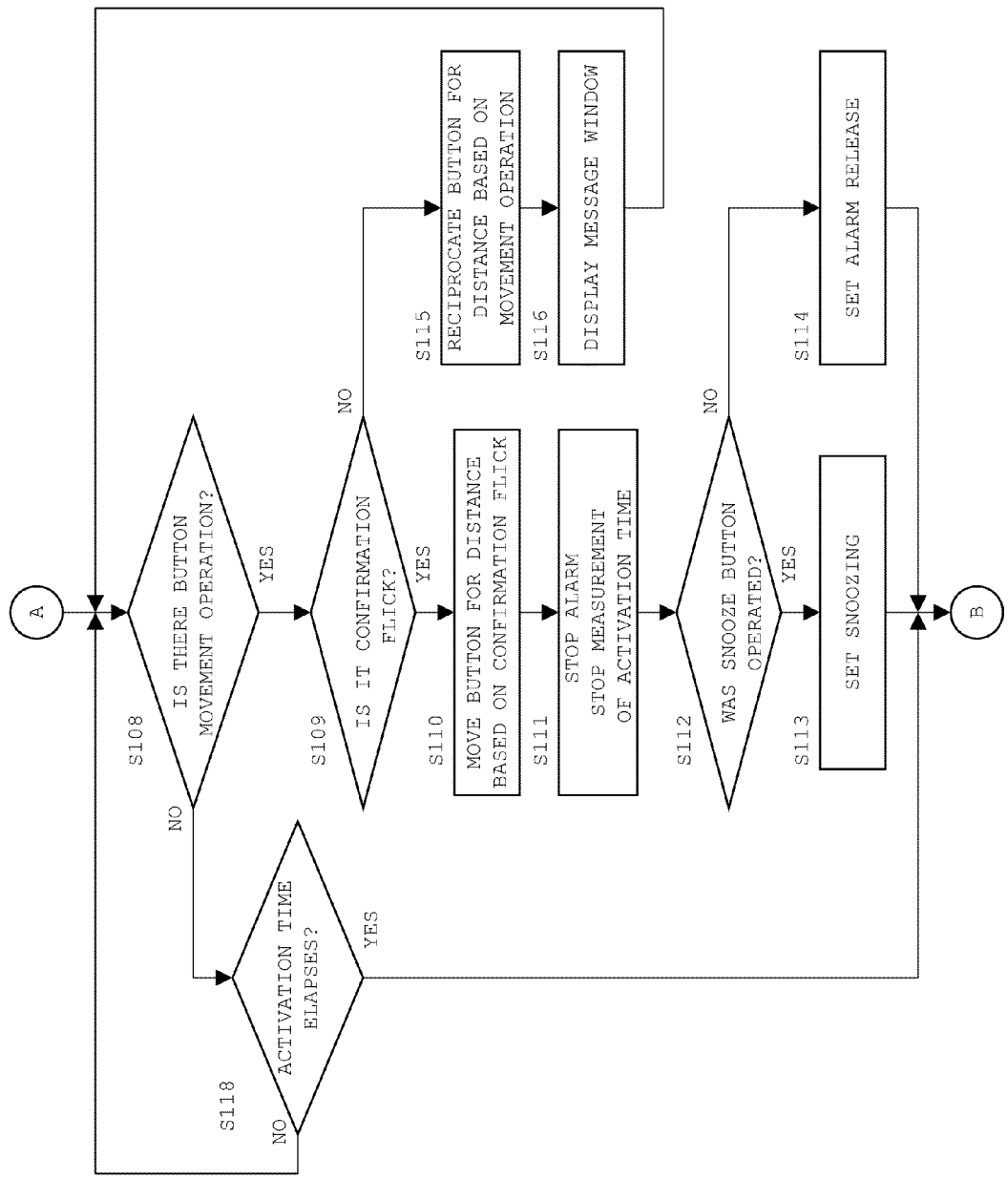
FIG. 6 is a flow chart showing the procedure for processing alarm notification control according to the embodiment.
Figure 7:
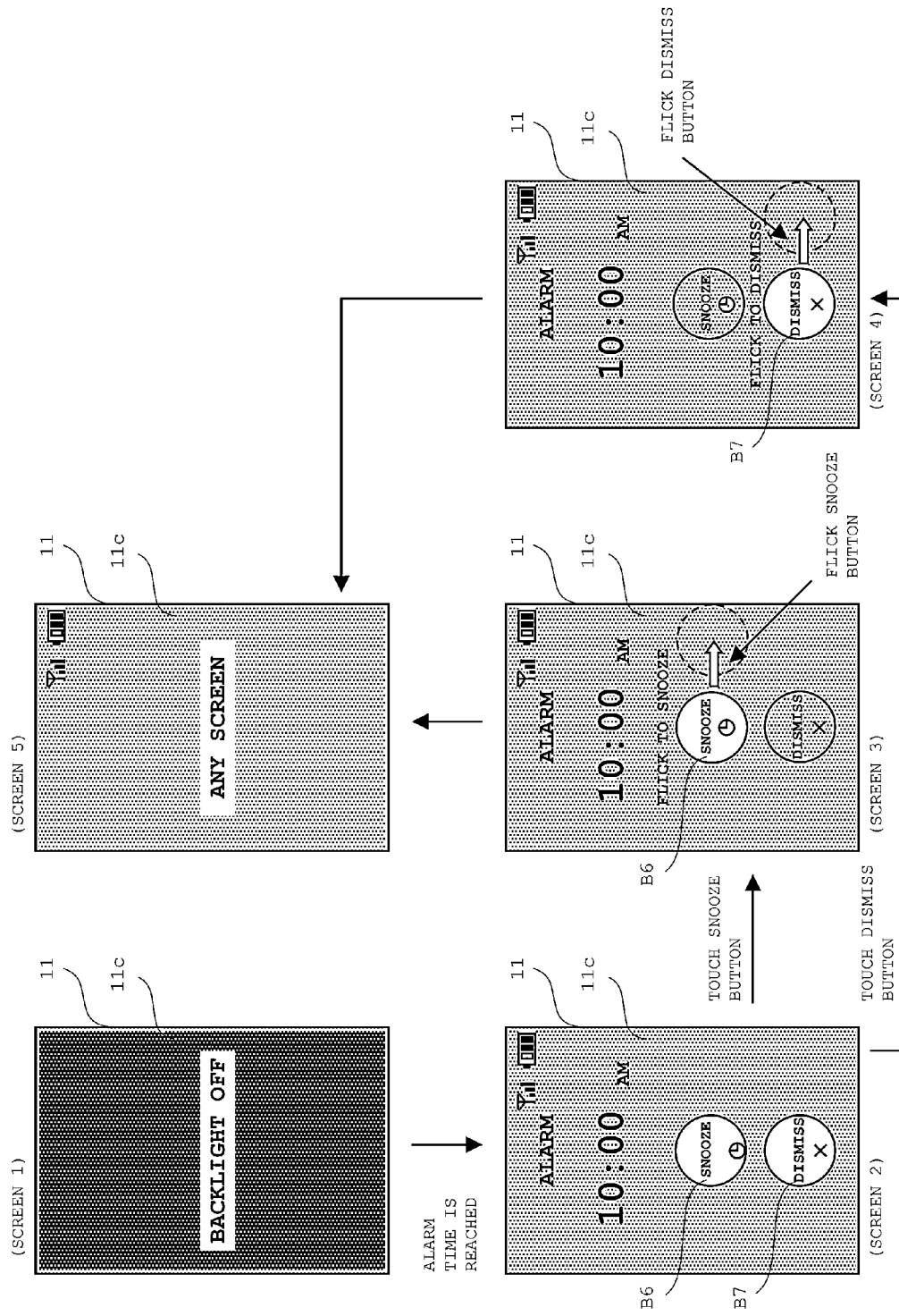
FIG. 7 is a diagram showing transition states of screen displays when alarm notification control is performed with the cellular phone closed according to the embodiment.
Figure 8:
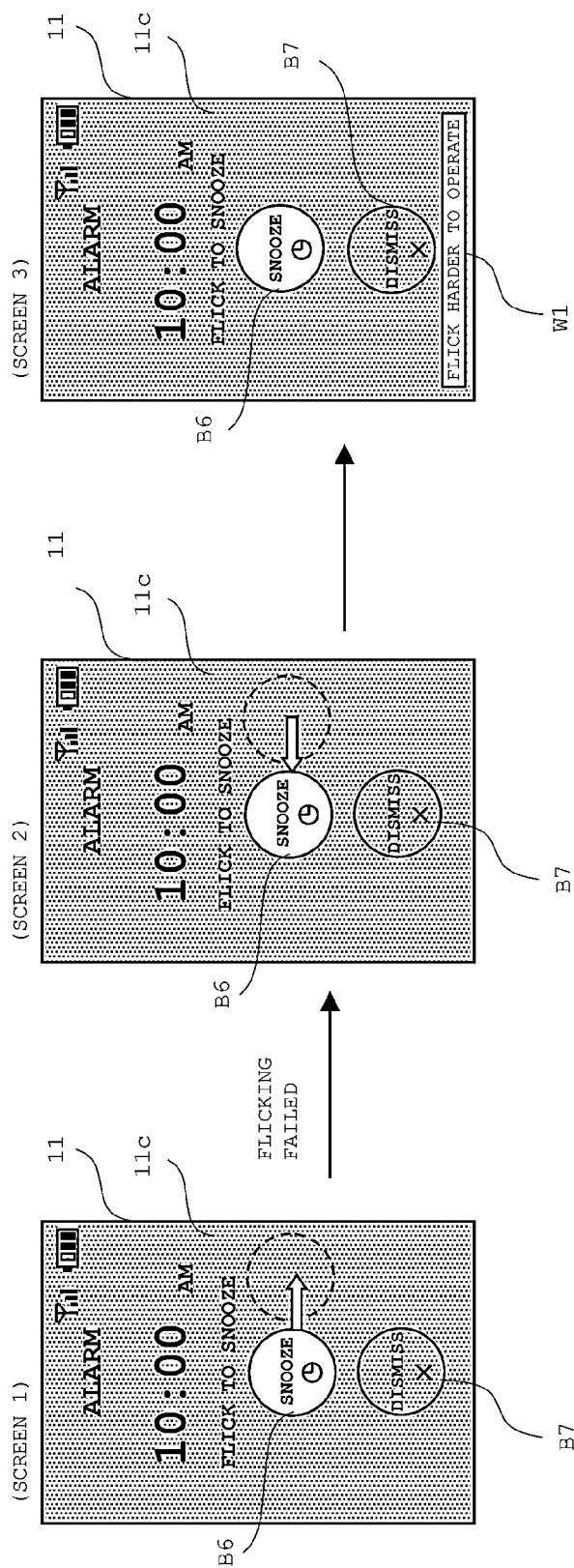
FIG. 8 is a diagram showing the transition states of the screen displays when alarm notification control is performed with the cellular phone closed according to the embodiment.
Figure 9:
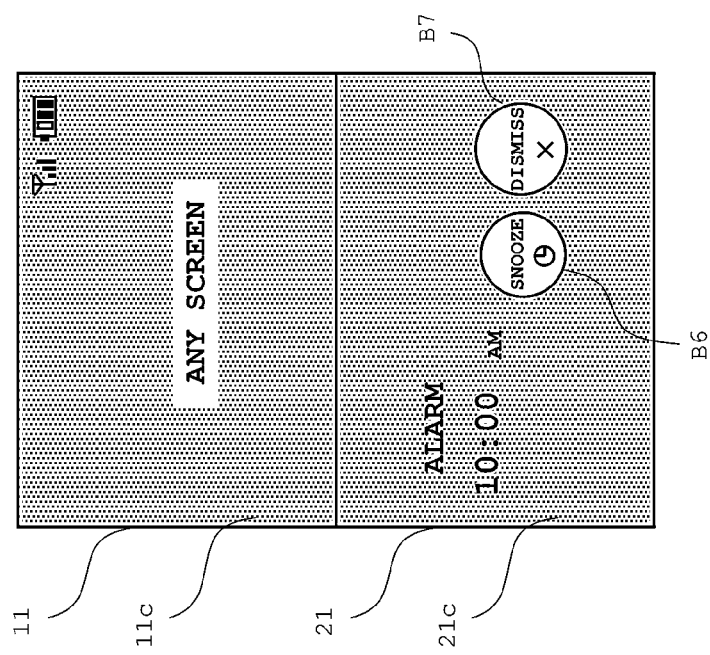
FIG. 9 is a diagram showing screen displays when an alarm is actuated with the cellular phone opened according to the embodiment.

FIG. 5 and FIG. 6 are flow charts showing procedures for processing alarm notification control. FIG. 7 and FIG. 8 are diagrams showing transition states of screen displays when the alarm notification control is performed with the cellular phone 1 closed. FIG. 9 is a diagram showing a screen display when alarm is activated with the cellular phone 1 opened.

With reference to FIG. 5 and FIG. 6, the CPU 100 monitors whether the alarm time is reached, based on time measured by the clock 311 (S101).

If the cellular phone 1 is in a standby state during this time, as shown in (Screen 1) of FIG. 7, the first backlight 11b is turned off and the first display surface 11c is turned off.

If the CPU 100 determines that the alarm time is reached (S101: YES), it activates the alarm (S102). Specifically, the CPU 100 outputs an audio signal for a predetermined alarm sound to the external speaker 308. This produces the predetermined alarm sound from the external speaker 308.

Next, the CPU 100 generates an alarm screen, and, as shown in (Screen 2) of FIG. 7, displays the generated alarm screen on the first display surface 11c (S103) if the cellular phone 1 is closed. On the alarm screen, the snooze button B6 and the dismiss button B7 are displayed together with time. The buttons B6 and B7 have a color tone different to each other.

If the cellular phone 1 is open, as shown in FIG. 9, the alarm screen is displayed on one of the display surfaces, for example, on the second display surface 21c. Then, the screen which was displayed before the alarm was activated remains displayed on the other display surface. The same alarm screen may be displayed on each of the display surfaces 11c and 21c, or one alarm screen may be displayed on a large display surface made by combining both of the display surfaces 11c and 21c.

Next, the CPU 100 determines whether alarm activation time set in advance (10 minutes, for example) has elapsed (S104). If it is not (S104: NO), the CPU 100 monitors whether any button of the snooze button B6 or the dismiss button B7 is touched (S105).

If the user wishes to stop the alarm sound and activate alarm again after predetermined standby time (5 minutes, for example) has elapsed, he/she touches the snooze button B6. On the one hand, if the user wishes to stop the alarm sound and cancel an alarm setting, he/she touches the dismiss button B7.

When either button is touched (S105: YES), the CPU 100 displays a method for operating the button in the periphery of the touched button (S106). Further, by adjusting a color tone of a button that was not touched, the CPU 100 darkens the button (S107). For example, when the snooze button B6 is touched, as shown in (Screen 3) of FIG. 7, not only the wording "Flick to Snooze" prompting the user to perform a flick operation appears above the snooze button B6, but also the dismiss button B7 darkens. On the one hand, when the dismiss button B7 is touched, as shown in (Screen 4) of FIG. 7, not only the wording "Flick to Dismiss" prompting the user to perform a flick operation appears above the dismiss button B7 but also the snooze button B6 darkens. With such displays, the user can clearly understand a button to operate and a method for operating it.

Then, the CPU 100 monitors whether an operation to move a touched button was performed, specifically, whether input to a button display position was detected and the input position directly moved (S108). If there was such a movement operation (S108: YES), the CPU 100 determines whether the movement operation is a confirmation flick (S109). If the movement operation is the confirmation flick (S109: YES), the CPU 100 displays that the flicked button moves in the flicked direction for a distance corresponding to strength of flicking (S110: See Screens 3 and 4 of FIG. 7). Then, it is determined that the flicking is stronger if a distance for which the input position moves within the unit time is larger than a first specified distance and the distance is larger, and then the button is moved broadly.

Subsequently, the CPU 100 stops the alarm (S111). Specifically, the CPU 100 stops the alarm sound by stopping output of an audio signal to the external speaker 308. Furthermore, the CPU 100 stops measuring of activation time (S111). If it is the snooze button B6 that was operated (S112: YES), the CPU 100 sets snoozing (S113). If it is the dismiss button B7 that was operated (S112: NO), the CPU 100 sets cancel of the alarm (S114).

Then, the CPU 100 returns the alarm screen displayed on the first display surface 11c (second display surface 21c) to the screen before the alarm is activated as shown in (Screen 5) of FIG. 7 (S118). If the alarm is activated in the standby state as shown in (Screen 1) of FIG. 7, the screen immediately before the standby state is displayed as the screen before the alarm is activated.

When the alarm cancel setting is performed, the CPU 100 shuts down the alarm application, and the alarm is no longer activated subsequently.

On the one hand, if the snooze setting is performed, the CPU 100 does not shut down the alarm application, and time after the standby time elapses since the alarm is stopped will be new alarm time. The CPU 100 monitors again in step S101 whether the alarm time is reached. When the standby time elapses after the alarm stops, the CPU 100 determines that the alarm time is reached (S101: YES), and activates the alarm again.

Incidentally, there are some cases in which although the user thinks that he/she did perform a confirmation flick, strength of flicking was not adequate. In such a case, it is determined in step S109 that the movement operation is not the confirmation flick (S109: NO). In this case, as shown in (Screen 1) and (Screen 2) of FIG. 8, the CPU 100 returns the button to its original position (S115) after moving the button once in a direction of the movement operation, depending on a distance for which the input position has been moved within the unit time. Then, the CPU 100 displays a message window W1 for a predetermined time (2 seconds, for example) on the alarm screen (S116). As shown in (Screen 3) of FIG. 8, for example, the message window W1 consisting of "Flick harder to operate" prompting the user to flick harder is displayed.

There are some cases in which the user does nothing while the alarm is active. There are also some cases in which the user touches either of the button B6 or B7 but does not perform any subsequent operation. In these cases, when the activation time elapses (S104: YES, S118: YES), the CPU 100 not only stops the alarm but also performs the alarm cancel setting (S117). Then, the CPU 100 returns the alarm screen displayed on the first display surface 11c (second display surface 21c) to the screen before the alarm is activated (S118).

Effects of Embodiment

As described above, according to the embodiment, during notification action by an alarm sound, the snooze button B6 or the dismiss button B7 is displayed on a first display surface 11c (second display surface 21c), and the notification action stops if a predetermined stop operation is performed on either of the button B6 or B7. Thus, even when any object and the like mistakenly touches the first display surface 11c (second display surface 21c), a notification action does not stop as far as the user does not touch the button B6 or B7. Hence, it is less likely that the notification action is stopped against the user's intention and desire.

In addition, according to the present invention, the notification action does not stop unless a predetermined movement operation, that is to say, a confirmation flick is performed on the snooze button B6 or the dismiss button B7. Thus, since the notification action does not stop even in the case in which any object and the like simply touches the snooze button B6 or the dismiss button B7, it is less likely that the notification action is stopped mistakenly.

In addition, according to the embodiment, if a movement operation is performed on the snooze button B6 or the dismiss button B7, the operated button moves in a direction of the movement operation. This makes it easier for the user to know that the button was operated.

Furthermore, according to the present invention, if the user's movement operation is not a confirmation flick, a message prompting him/her to operate correctly is displayed on the first display surface 11c (second display surface 21c). This makes it easier for the user to understand that he/she did not operate correctly.

Furthermore, according to the embodiment, a button is selected by the user touching the snooze button B6 or the dismiss button B7, and the notification action is stopped only when the user operates the button. This makes it less likely that notification action is mistakenly stopped.

Modification Example 1

Figure 10:
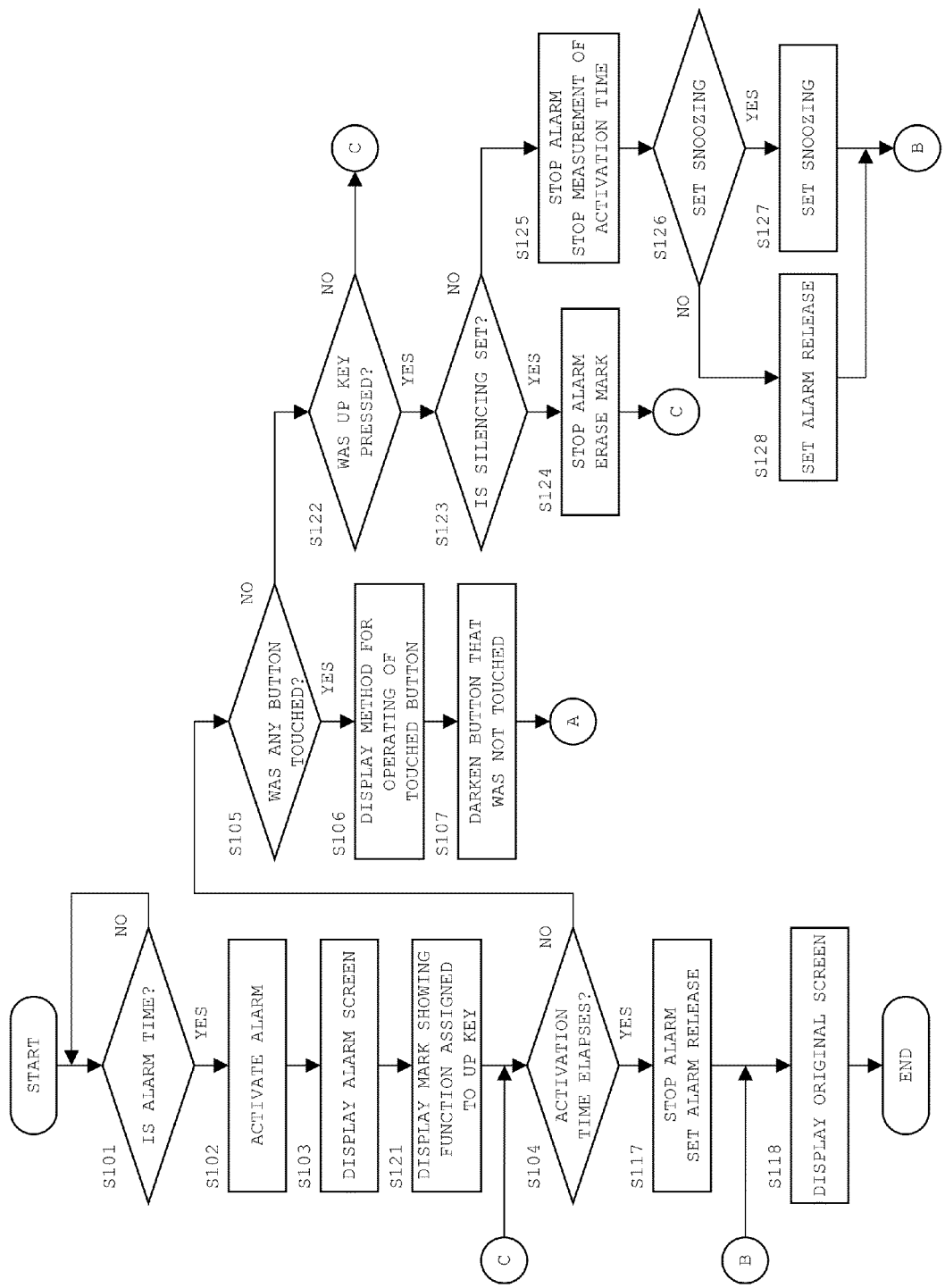
FIG. 10 is a flow chart showing a procedure for processing alarm notification control according to a modification example 1.
Figure 11:
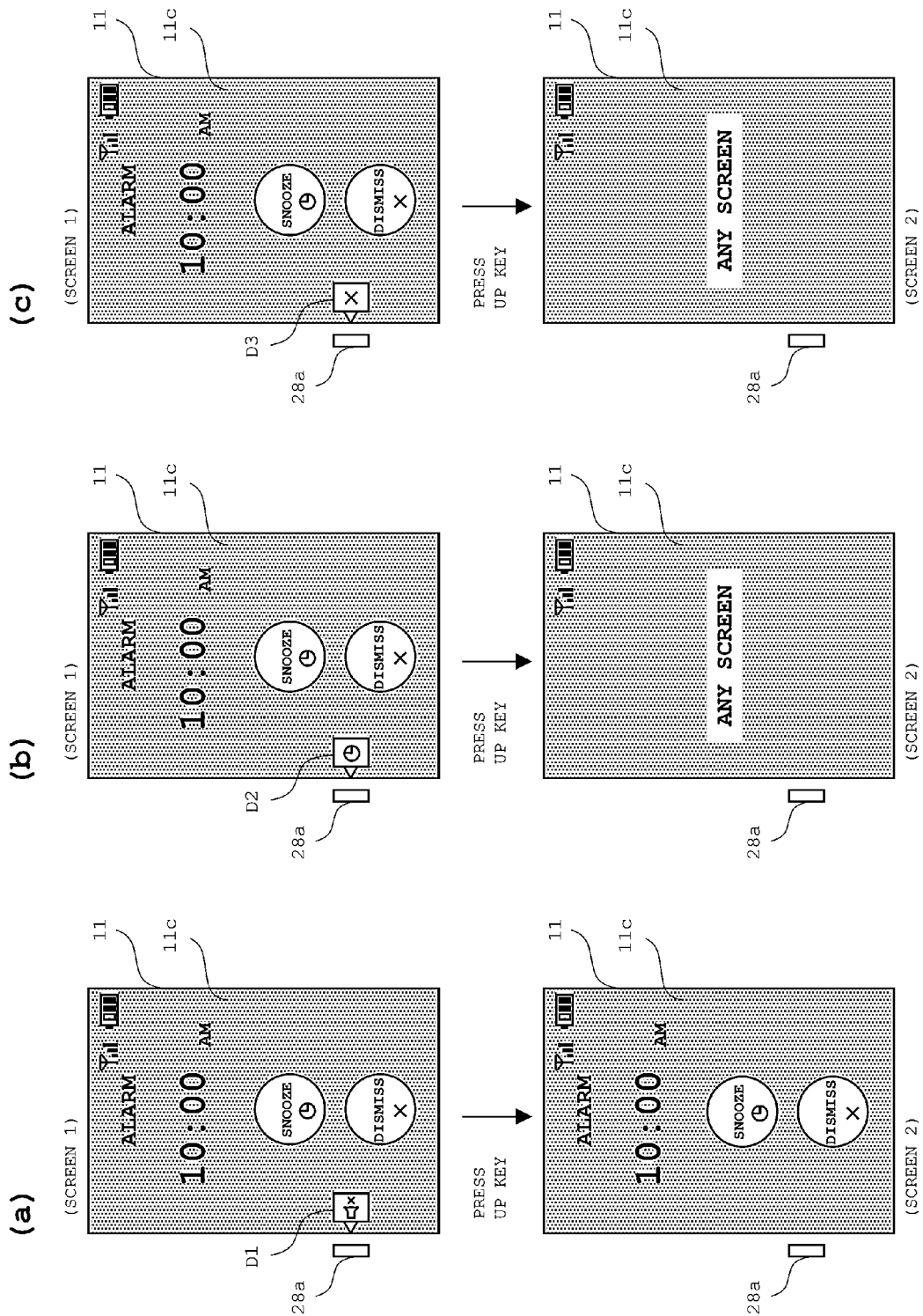
FIGS. 11(a) to 11(c) are diagrams showing transition states of screen displays when alarm notification control is performed with a cellular phone closed according to the modification example 1.

FIG. 10 is a flow chart showing a procedure for processing alarm notification control according to a modification example 1. FIGS. 11(a) to 11(c) are diagrams sowing transition states of screen displays when alarm notification control is performed with the cellular phone closed.

The modification example has a function to stop alarm through an operation on the hard key provided on a different location from the display surfaces 11c and 21c as well as an operation on the snooze button B6 and the dismiss button B7, which are soft keys, displayed on the display surface 11c or 21c. In the modification example, the up key 28a of the volume key 28 is used as the hard key.

As shown in FIG. 10, in the alarm notification control of the modification example, processes of steps S121 to S128 are added to the alarm notification control of the above embodiment as shown in FIG. 5. Any process other than them is similar to those in the above embodiment.

With reference to FIG. 10, when the alarm screen is displayed (S103), the CPU 100 displays marks D1, D2, D3 which indicates functions assigned to the up key 28a at a position close to the up key 28a on the alarm screen as shown in (Screen 1) of FIGS. 11(a), 11(b) and 11(c). By performing a predetermined setting operation in advance, the user can select one of three functions of "silencing", "snoozing", and "alarm canceling", and set the selected function as a function that can be performed by an operation of the up key 28a. For example, if the "silencing" function is set, as shown in FIG. 11(a), the mark D1 corresponding to the "silencing" function appears. If the "snoozing" function is set, as shown in FIG. 11(b), the mark D2 corresponding to the "snoozing" function appears. If the "alarm canceling" function is set, as shown in FIG. 11(c), the mark D3 corresponding to the "alarm canceling" function appears. The user can also perform a setting that prevents any of the three functions from being performed. In this case, the marks D1, D2 and D3 do not appear, and any operation on the up key 28a is disabled.

The CPU 100 monitors, while the alarm is active (S106), not only whether the snooze button B6 or the dismiss button B7 was touched but also whether the up key 28a was pressed (S122).

If the "silencing" function has been set (S123: YES), when the up key 28a is pressed (S122: YES), the CPU 100 not only stops the alarm but also erases the mark D1 (S124). As shown in (Screen 2) of FIG. 11(a), although the mark D1 disappears from the alarm screen, the alarm screen itself remains displayed. Then, measurement of activation time continues, and the process returns to step S104.

On the one hand, if the "silencing" function is not set, that is, the "snoozing" or "alarm canceling" function has been set (S123: NO) when the up key 28a is pressed (S122: YES), the CPU 100 stops not only the alarm but also measurement of the activation time (S125). The CPU 100 sets snoozing (S127) if the "snoozing" function has been set (S126: YES), and performs the alarm cancel setting (S128) if the "the alarm cancel" function has been set (S127: NO).

Then, the process of step S118 is performed, and as shown in (Screen 2) of FIGS. 11(b) and 11(c), the screen before the alarm is activated is displayed on the first display surface 11c.

Thus, if the "silencing" function has been set in advance, the user can stop only the alarm sound by pressing the up key 28a. In addition, if the "snoozing" function has been set in advance, the user can not only stop the alarm sound, but also activate the alarm after a predetermined standby time elapses without operating the snooze button B6. Furthermore, if the "alarm canceling" function has been set in advance, the user can not only stop the alarm sound, but also cancel the setting of the alarm without operating the dismiss button B7.

As described above, according to the modification example, by operating the hard key (up key 28a) placed in a different position from the display surfaces 11c and 21c, it is possible to stop the notification action of the alarm sound without operating the display surfaces 11c and 21c. In addition, one operation of the up key 28a can stop the notification action, thus making the operation easy.

Further, according to the modification example, the hard key for stopping the notification action is arranged to be close to the display surfaces 11c and 21c, and the marks D1, D2 and D3 are displayed close to the hard key on the display surfaces 11c and 21c. This makes it easier for the user to understand that he/she can use the hard key.

Since the operation on the display surfaces 11c and 21c (touch sensors 12, 22) is simply touching the display surfaces 11c and 21c, almost no force is needed to press the display surfaces 11c and 21c. In contrast, the operation on the up key 28a needs larger pressing force than the operation on the display surfaces 11c and 21c. Thus, even if an object collides with the up key 28a, it is less likely to be accepted as an operation.

Modification Example 2

In the above embodiment, if the user selects either of the snooze button B6 or the dismiss button B7 by tapping it and then performs a confirmation flick on the selected button, the alarm stops. As shown in this modification example, however, the operation to stop the alarm on the snooze button B6 or the dismiss button B7 may not be the confirmation flick, but may be replaced with dragging for more than a predetermined distance.

Figure 12:
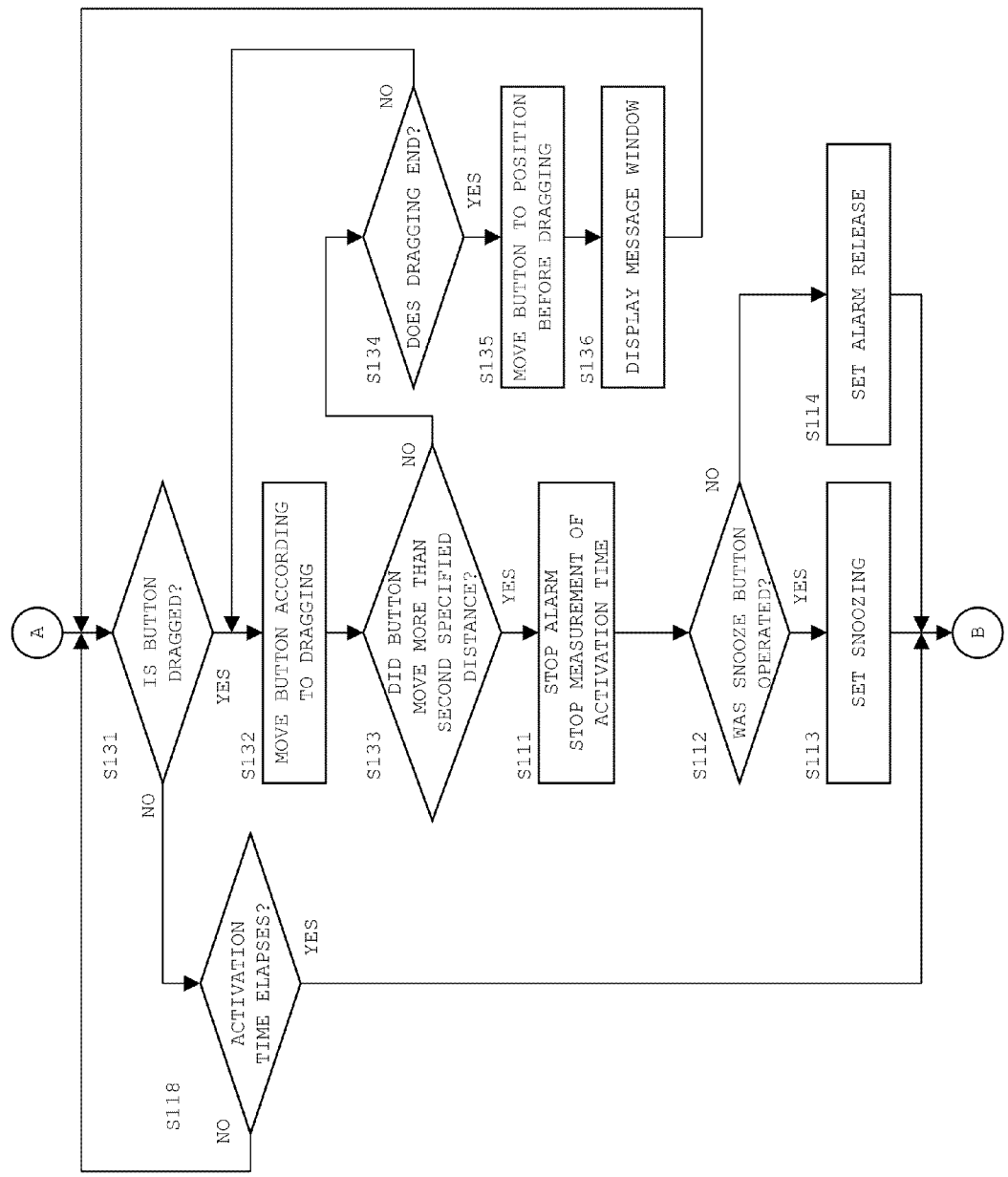
FIG. 12 is a flow chart showing a procedure for processing alarm notification control according to a modification example 2.

FIG. 12 is a flow chart showing a procedure for processing alarm notification control according to the modification example 2.

As shown in FIG. 12, in the alarm notification control of the modification example, the processes of steps S108 to S110, S115 and S116 in the alarm notification control of the above embodiment as shown in FIG. 6 are replaced by processes of steps S131 to S136. Any process other than them is similar to those in the above embodiment.

As shown in FIG. 5, when either of the snooze button B6 or the dismiss button B7 is touched (S105: YES), a method for operating the touched button is displayed (S106), the button that was not touched is darkened (S107), and then the process shifts to step S131 as shown in FIG. 12.

In step S131, the CPU 100 determines whether the button that was tapped earlier has been dragged. If the user has dragged the button (S131: YES), the CPU 100 moves the button according to the dragging (S132). Specifically, as an input position on the first display surface 11c (second display surface 21c) moves, the CPU 100 displays the button so as to follow the movement of the input position. Similar to (Screen 3) and (Screen 4) of FIG. 7, the button moves on the first display surface 11c (second display surface 21c).

When the dragged button moves more than a second specified distance (320 pixels, for example) that has been defined in advance (S133: YES), the CPU 100 stops not only the alarm but also measurement of activation time (S111). Subsequently, processing will be performed similar to the above embodiment.

On the one hand, when the dragging ends before the button moves to the second specified distance (S133: NO S134: YES), the CPU 100 moves the button to the position before the dragging (S135), similar to (Screen 2) of FIG. 8. Subsequently, the CPU 100 displays the message window W1 for a predetermined time (2 seconds, for example) on the alarm screen (S136), similar to (Screen 3) of FIG. 8. In this case, the message window W1 consists of a phrase prompting the user to drag longer than the earlier dragging.

Similar to the above embodiment, the configuration such as the modification example can also make it less likely that the notification action is stopped against the user's intention and desire.

Although the modification example is such configured that the alarm stops if a dragging for more than a predetermined distance is performed instead of a confirmation flick, it may be configured to stop the alarm when either of a confirmation flick or dragging more than a predetermined distance is performed. In addition, the configuration of this modification example may be applied to that of the modification example 1.

Modification Example 3

In the modification example 2, the alarm stops if the snooze button B6 or the dismiss button B7 is dragged more than a predetermined distance. As in this modification example, however, a configuration may be such that the alarm stops if the snooze button B6 or the dismiss button B7 displayed on one of the display surface 11c or 21c is dragged to the other of the display surface 11c or 21c, when the cellular phone 1 is in the open state.

Figure 13:
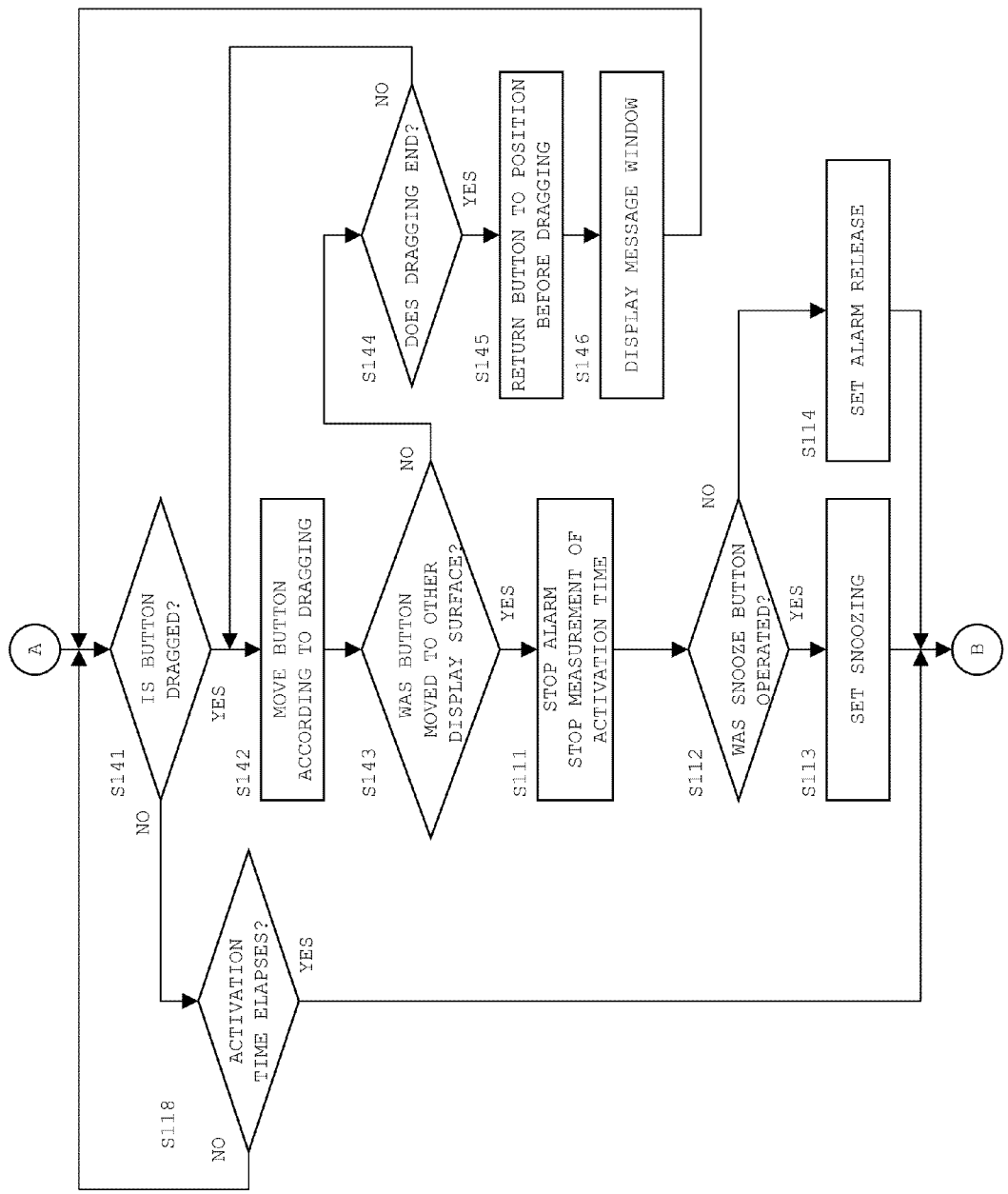
FIG. 13 is a flow chart showing a procedure for processing alarm notification control according to a modification example 3.
Figure 14:
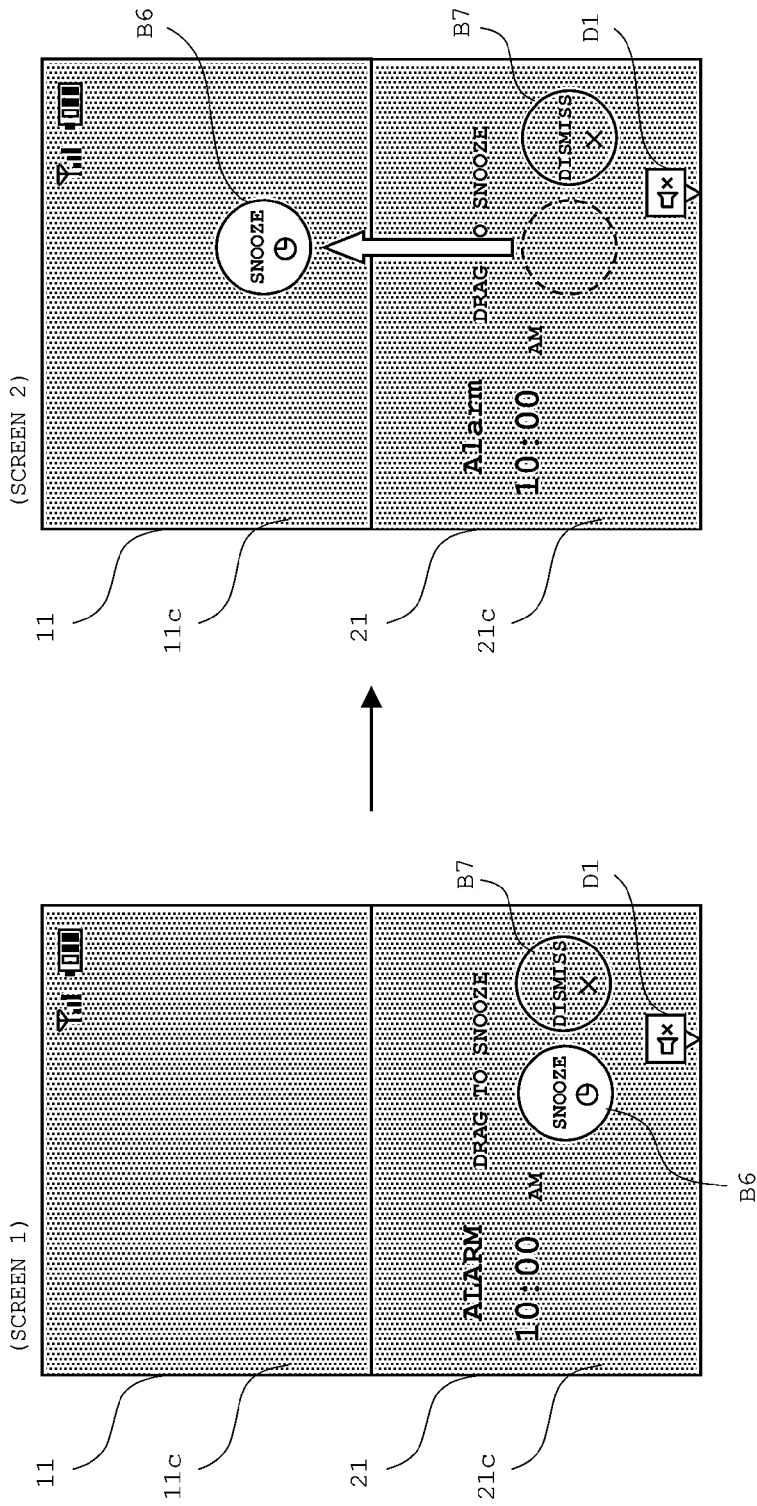
FIG. 14 is a diagram showing screen displays when alarm notification control is performed according to the modification example 3.

FIG. 13 is a flow chart showing a procedure for processing alarm notification control according to the modification example 3. FIG. 14 is a diagram showing screen displays when the alarm notification control is performed.

As shown in FIG. 13, in the alarm notification control of the modification example, the processes of steps S108 to S110, S115 and S116 in the alarm notification control of the embodiment as shown in FIG. 6 or the processes of steps S131 to S136 in the alarm notification control of the modification example 2 as shown in FIG. 12 can be replaced with the processes of steps S141 to S146. Any process other than them is similar to those in the above embodiment and the modification example 2.

As shown in FIG. 5, when either of the snooze button B6 or the dismiss button B7 is touched (S105: YES), a method for operating the touched button is displayed (S106), the button that was not touched is darkened (S107), and then the process shifts to step S141 shown in FIG. 13.

If the CPU 100 determines that the button that was tapped earlier was dragged (S141: YES), it moves the button in response to the dragging (S142). Then, the CPU 100 determines whether the dragged button was moved to the other display surface (S143).

For example, as shown in (Screen 1) of FIG. 14, when the alarm screen is displayed on the second display surface 21c, the user selects the snooze button B6 and drags the snooze button B6 to the first display surface 11c, as shown in (Screen 2) of FIG. 14, for example.

If the CPU 100 determines that the dragged button was moved to the other display surface (S143: YES), it stops not only the alarm but also measurement of activation time (S111). Subsequently, the processing will be performed similar to the above embodiment.

If the dragging ends before the button moves to the other display surface (S143: NO→S144: YES), the CPU 100 moves the button to the position before the dragging (S145). Then, the CPU 100 displays the message window W1 for a predetermined time (2 seconds, for example) on the alarm screen (S146). In this case, the message window W1 consists of a phrase prompting the user to drag the button to the other display surface.

Similar to the above embodiment, the configuration such as the modification example can also make it less likely that the notification action is stopped against the user's intention and desire.

The configuration of the modification example may be applied to that of the modification example 1.

Modification Example 4

In the above embodiment, when a confirmation flick is performed on the snooze button B6 or the dismiss button B7, the alarm stops and then a screen before the alarm is activated appears on the first display surface 11c (second display surface 21c). If a predetermined application related to the alarm is set, as in this modification example, however, a screen of that application may be displayed.

Figure 15:
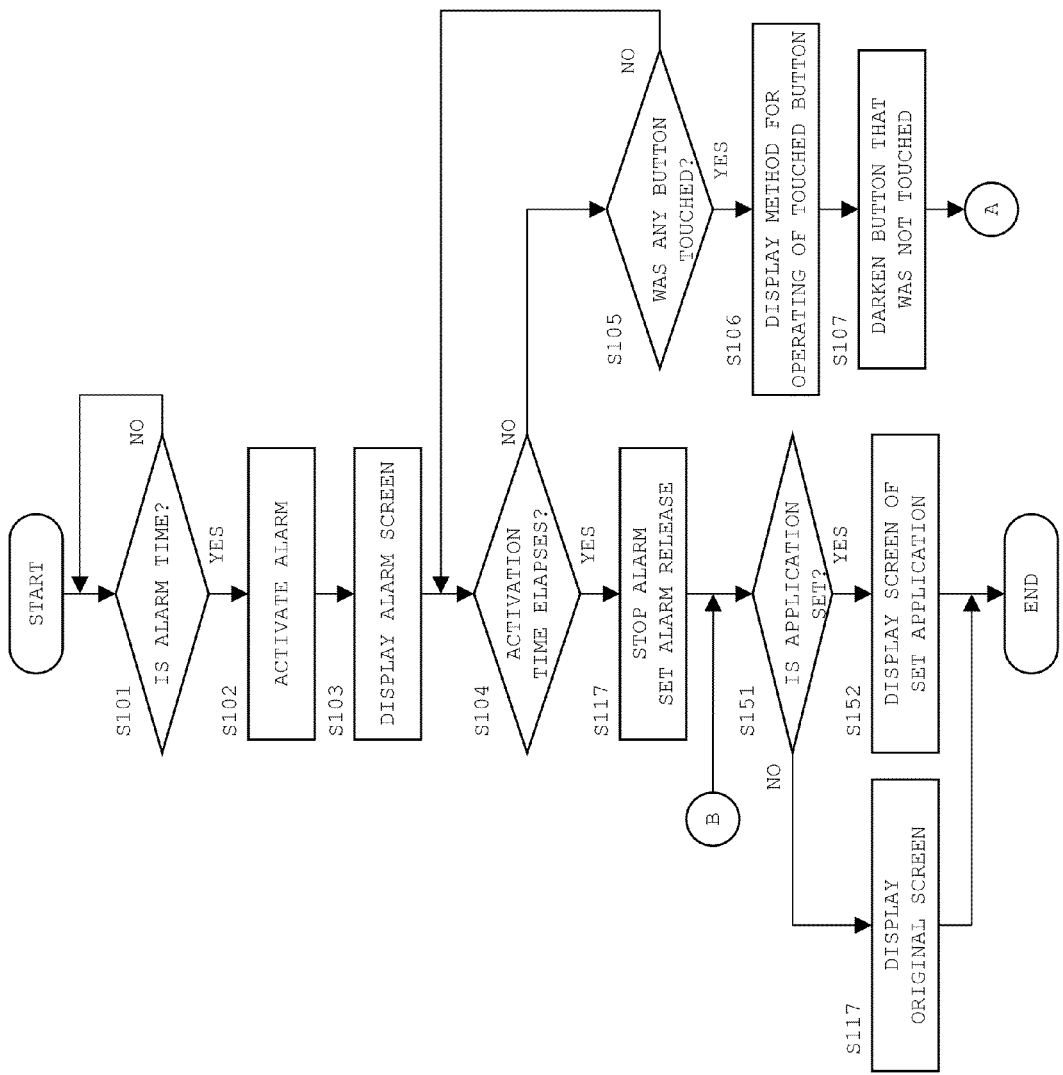
FIG. 15 is a flow chart showing a procedure for processing alarm notification control according to a modification example 4.

FIG. 15 is a flow chart showing a procedure for processing alarm notification control according to the modification example 4. FIGS. 16(a) to 16(c) are diagrams showing screen displays when the alarm notification control is performed.

As shown in FIG. 15, in the alarm notification control of the modification example, processes of steps S151 and S152 are added to the alarm notification control of the above embodiment as shown in FIG. 5. Any process other than them is similar to those in the above embodiment.

If the alarm stops as a confirmation flick is performed on the snooze button B6 or the dismiss button B7, or as the activation time elapses (S111, S117), the CPU 100 determines whether a predetermined application related to the alarm has been set (S151).

For example, after the alarm time is set with the setting screen as shown in FIG. 4(b), a screen for selecting an application is displayed. For example, on the selection screen, such items of the application as an e-mail, an address book, a web browser and the like are displayed. When a user selects a desired application from them, the application is set as an alarm-related application. The set application is stored in the memory 200.

Figure 16:
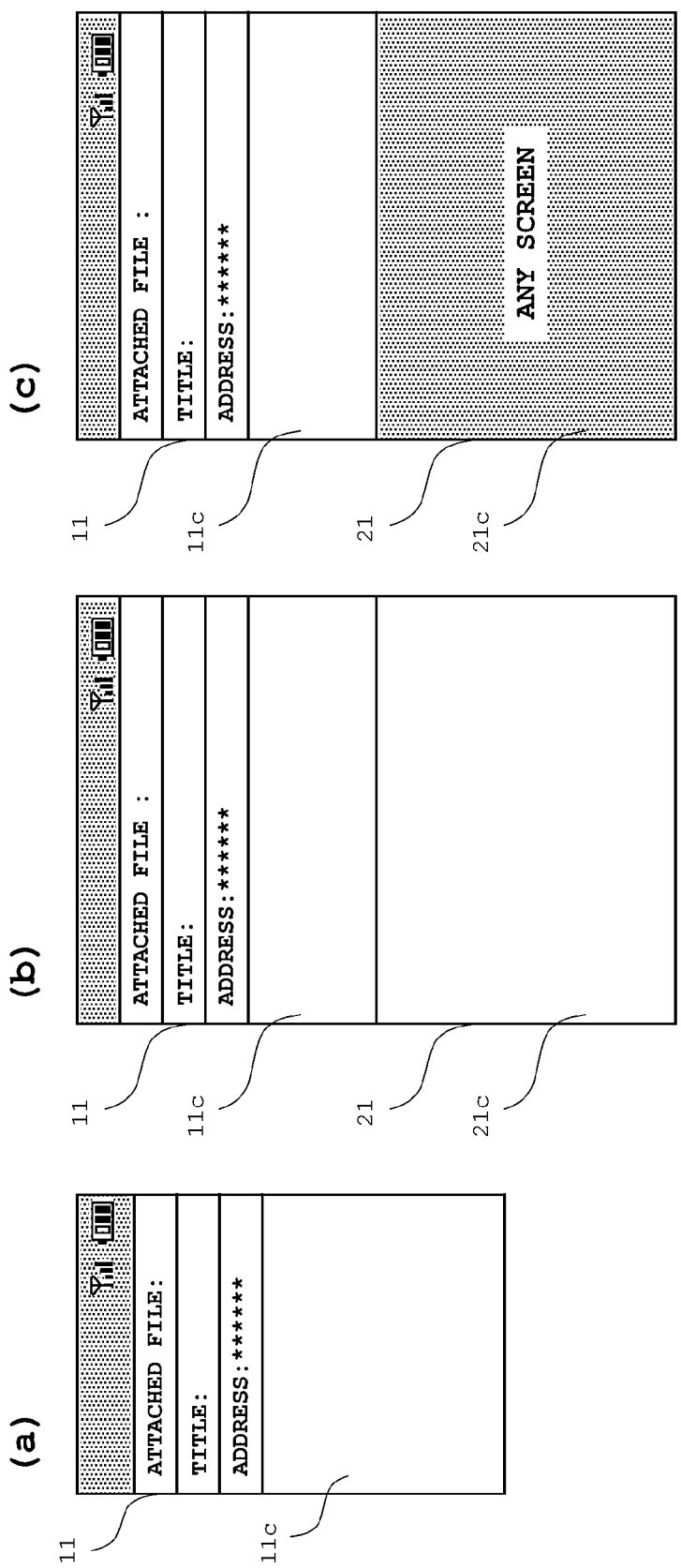
FIGS. 16(a) to 16(c) are diagrams showing screen displays when alarm notification control is performed according to the modification example 4.

If the alarm-related application is set (S151:YES), the CPU 100 initiates the application and displays an execution screen of the application on a first display surface 11c (second display surface 21c) (S152). For example, if the e-mail application is set and the cellular phone 1 is closed, as shown in FIG. 16(a), an execution screen determined in the e-mail application, for example, a mail composing screen, is displayed on the first display surface 11c. If the e-mail application is set and the cellular phone 1 is open, as shown in FIG. 16(b), the mail composing screen is displayed on the first display surface 11c and the second display surface 21c. Alternatively, when the cellular phone 1 is open, as shown in FIG. 16(c), the mail composing screen is displayed on one of the display surfaces, and a screen displayed before the alarm is activated appears on other display surface. The user may be allowed to set the display style of FIG. 16 (b) or FIG. 16 (c) in advance. In the case of the e-mail application, a destination (address) that has been set in advance on the mail composing screen may be automatically displayed. In the case of the web browser, a screen of web site that has been set in advance may be displayed. In the case of the address book application, information (such as a telephone number, an address and the like) of a person that has been set in advance may be displayed.

With the configuration of the modification example, if the user sets the alarm to notify timing to execute a predetermined application, the user can initiate the set application in conjunction of an operation to stop the alarm if he/she has set the application he/she wishes to run. This improves convenience to the user.

The configuration of the modification example may be applied to that of the modification example 1, the modification example 2, and the modification example 3.

<Others>

Although the embodiment and the modification examples of the present invention have been described above, the present invention shall not be limited at all by the above embodiment or the modification examples, and various changes can be made to the embodiment, in addition to the above.

For example, the above embodiment is such configured that notification is performed using an alarm sound from the external speaker 308. The notification action is not limited to a usage of an alarm sound, however, a configuration may be such that a vibrator is provided in the cellular phone 1 and notification is performed using vibration of the vibrator. In addition, notification may be performed using both the alarm sound and the vibration. Furthermore, a configuration may be such that the user can set whether to turn on or off the alarm sound and whether to turn on or off the vibration.

In addition, in the above embodiment, the configuration is such that the message window W1 is displayed if a movement operation on the snooze button B6 or the dismiss button B7 is not a confirmation flick. The message window W1 may not necessarily be displayed, however. In place of or together with the message window W1, a notification sound indicating that the operation on the buttons B6 and B7 was not received may be produced.

Furthermore, in the above embodiment, the configuration is such that the snooze button B6 or the dismiss button B7 is selected when the either button is touched. A configuration is not limited to this, however, and may be such that the button is selected by a specific touch operation such as tapping, long tapping and the like.

There are some cases in which an incoming call or an e-mail is received during alarm notification. In this case, the alarm is stopped and instead, arrival notification is performed with a ring alert. Accordingly, a display on the first display surface 11c (second display surface 21c) is switched from the alarm screen to an arrival notification screen including arrival information such as a telephone number and so on. In addition, if low battery is detected during the alarm notification, the alarm is stopped and low battery notification is performed, notifying with a beep sound that indicating that the remaining battery charge is low. Accordingly, the display on the first display surface 11c (second display surface 21c) is switched from the alarm screen to a notification screen informing that the remaining battery charge is low.

When the arrival notification or the low battery notification ends, the alarm screen appears again on the first display surface 11c (second display surface 21c) and the alarm is activated. Then, if the snooze button B6 or the dismiss button B7 was selected, a method for the operation was displayed on the alarm screen, and the button that was not selected darkened before the arrival notification or the low battery notification is performed, the alarm screen for that state is displayed again.

In addition, although both of the snooze button B6 and the dismiss button B7 are displayed on the alarm screen in the above embodiment, only either of the button B6 or B7 may be displayed. In addition, in place of at least either of the button B6 or B7, or in addition to the buttons B6 and B7, a voice off button for stopping an alarm sound only may be displayed. If an operation such as a confirmation flick is performed on the voice off button, the CPU 100 does not stop activation time and keeps the alarm screen displayed although it stops the alarm.

In addition, in the above embodiment, when the cellular phone 1 is open, the user may close the cellular phone 1 while the alarm is operating. In this case, if it is detected that the cellular phone 1 is switched from the closed state to the open state, the CPU 100 not only stops the alarm but also performs the alarm cancel setting or the snooze setting. The user can set in advance which to perform the alarm cancel setting or the snooze setting.

In addition, the mobile terminal device of the present invention is not limited to a cellular phone, but may be a PDA (Personal Digital Assistant), a tablet PC (Tablet PC) and so forth.

Besides, various types of changes may be made to the embodiment of the present invention, as appropriate, as far as they fall within a scope of technical idea as shown in the Claims.

REFERENCE SIGNS LIST

11 First display
12 First touch sensor
14 Magnet
16 Protruding portion
17 Protruding portion
21 Second display
22 Second touch sensor
23 Magnet
26 Shaft portion
27 Shaft portion
28a Up key 34 Coil spring
39 Guiding groove
200 Memory
308 External speaker
B6 Snooze button
B7 Dismiss button
W1 Message window

The invention claimed is:

1. A mobile terminal device comprising:
   a display that includes a first display and a second display;
   a mechanism section which can be switched between a closed state and an open state, wherein in the closed state the first display is exposed and the second display is hidden, and wherein in the open state the first display is exposed and at least part of the second display is exposed;
   a receiving section which receives an operation on the display; and
   at least one control section that
      displays one or more screens for setting an alarm,
      receives a user-specified alarm time through the one or more screens,
      receives a user selection of an alarm-related application to be associated with the alarm through the one or more screens,
      at the alarm time, activates the alarm, initiates a notification action, and displays on the display a first object image and a second object image,
      when the receiving section receives a movement operation for the first object image, cancels the alarm, stops the notification action, and executes the alarm-related application, and,
      when the receiving section receives an operation for the second object image, stops the notification action for a predetermined length of time and resumes the notification action after the predetermined length of time,
   wherein each of the movement operation for the first object image and the operation for the second object image comprises moving the object image according to a predetermined standard, and
   wherein, in the open state,
      the at least one control section displays the first object image and the second object image on one of the first display and the second display, and
      each of the movement operation for the first object image and the operation for the second object image comprises moving the object images from the one of the first display and the second display to the other of the first display and the second display.

2. The mobile terminal device according to claim 1, wherein the predetermined standard comprises a predetermined distance within unit time.

3. The mobile terminal device according to claim 1, wherein the predetermined standard comprises a predetermined distance.

4. The mobile terminal device according to claim 1, wherein the at least one control section displays on the display an image prompting an operation which satisfies the predetermined standard when the receiving section receives an operation which does not satisfy the predetermined standard.

5. The mobile terminal device according to claim 1, wherein the at least one control section moves a display position of the first object image or the second object image depending on the operation.

6. The mobile terminal device according to claim 1 further comprising a hard key, wherein the at least one control section stops the notification action when the hard key is operated before the receiving section receives the operation for either of the object images.

7. The mobile terminal device according to claim 6, wherein the hard key is positioned close to the display, and wherein the at least one control section displays a mark on the display close to the hard key that indicates a function of the hard key.

8. The mobile terminal device according to claim 7, wherein the function of the hard key is one of a plurality of functions assigned to the hard key by a user.

9. The mobile terminal device according to claim 8, wherein the plurality of functions comprise stopping the notification action while keeping the alarm activated, stopping the notification action for a predetermined length of time while keeping the alarm activated, and stopping the notification action while canceling the alarm.

10. The mobile terminal device according to claim 1, wherein each of the movement operation for the first object image and the operation for the second object image is a flick operation.

11. The mobile terminal device according to claim 1, wherein the first object image has a different color tone than the second object image.

12. The mobile terminal device according to claim 1, wherein, during the operation for one of the first object image and the second object image, the at least one control section darkens the other one of the first object image and the second object image.

13. The mobile terminal device according to claim 1, wherein the at least one control section stops the notification action if the notification action is maintained for more than a predetermined length of time.

14. The mobile terminal device according to claim 1, wherein the alarm-related application is an e-mail application, and wherein executing the alarm-related application comprises displaying a screen for composing an e-mail in which a destination e-mail address, that has been set in advance, is displayed.

15. The mobile terminal device according to claim 1, wherein the alarm-related application is a web browser, and wherein executing the alarm-related application comprises displaying a web site that has been set in advance.

16. The mobile terminal device according to claim 1, wherein the alarm-related application is an address book, and wherein executing the alarm-related application comprises displaying information from the address book for a person that has been set in advance.

17. A non-transitory storage medium holding a computer program which provides a computer of a mobile terminal device, comprising a display that includes a first display and a second display, a receiving section which receives an operation on the display, and a mechanism section which can be switched between a closed state, in which the first display is exposed and the second display is hidden, and an open state, in which the first display is exposed and at least part of the second display is exposed, with capabilities of:
   displaying one or more screens for setting an alarm;
   receiving a user-specified alarm time through the one or more screens;
   receiving a user selection of an alarm-related application to be associated with the alarm through the one or more screens;

at the alarm time, activating the alarm, initiating a notification action, and displaying on the display a first object image and a second object image;

when the receiving section receives a movement operation for the first object image, canceling the alarm, stopping the notification action, and executing the alarm-related application; and when the receiving section receives an operation for the second object image, stopping the notification action for a predetermined length of time and resuming the notification action after the predetermined length of time, wherein each of the movement operation for the first object image and the operation for the second object image comprises moving the object image according to a predetermined standard, and wherein, in the open state,
the first object image and the second object image are displayed on one of the first display and the second display, and each of the movement operation for the first object image and the operation for the second object image comprises moving the object images from the one of the first display and the second display to the other of the first display and the second display.

18. A notification control method of a mobile terminal device comprising a display that includes a first display and a second display, a receiving section which receives an operation on the display, and a mechanism section which can be switched between a closed state, in which the first display is exposed and the second display is hidden, and an open state, in which the first display is exposed and at least part of the second display is exposed, the notification control method comprising:

displaying one or more screens for setting an alarm;

receiving a user-specified alarm time through the one or more screens;

receiving a user selection of an alarm-related application to be associated with the alarm through the one or more screens;

at the alarm time, activating the alarm, initiating a notification action, and displaying on the display a first object image and a second object image;

when the receiving section receives a movement operation for the first object image, canceling the alarm, stopping the notification action, and executing the alarm-related application; and when the receiving section receives an operation for the second object image, stopping the notification action for a predetermined length of time and resuming the notification action after the predetermined length of time, wherein each of the movement operation for the first object image and the operation for the second object image comprises moving the object image according to a predetermined standard, and wherein, in the open state,
the first object image and the second object image are displayed on one of the first display and the second display, and each of the movement operation for the first object image and the operation for the second object image comprises moving the object images from the one of the first display and the second display to the other of the first display and the second display.

* * * * *